April 12, 1927.
W. R. TEMPLETON
TRAP
Filed Dec. 2, 1921
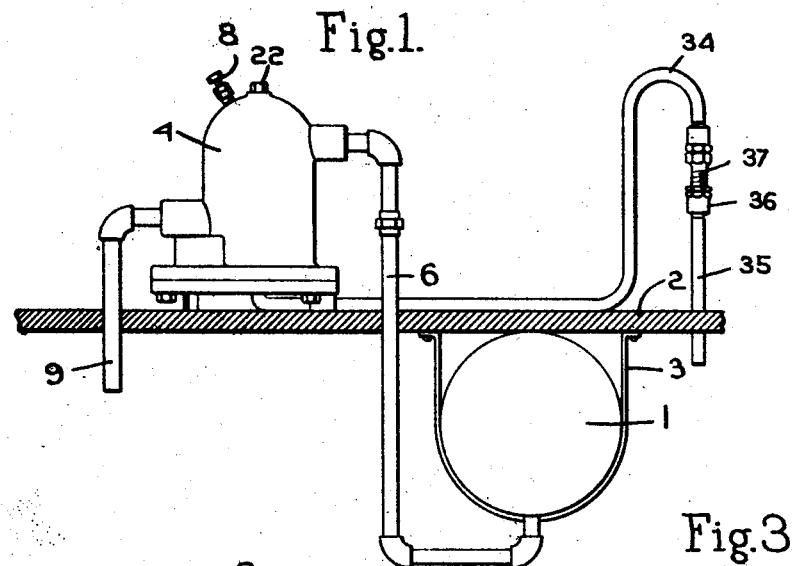
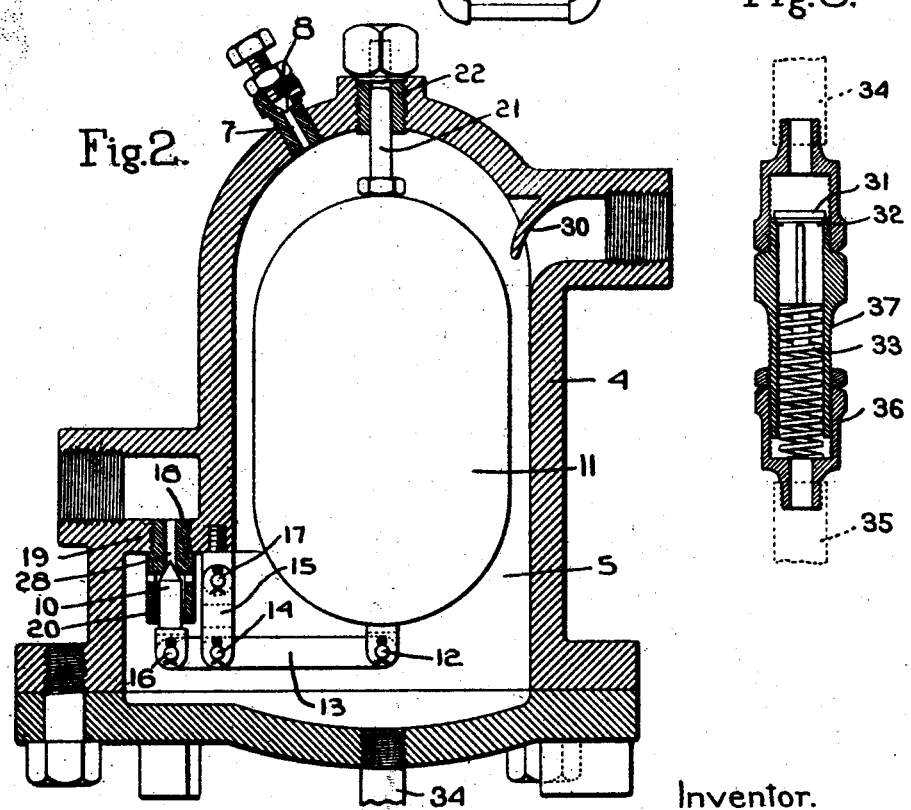
Inventor.
William R. Templeton
by Heard Smith & Tennant
Attys.

Patented Apr. 12, 1927.

1,624,446

UNITED STATES PATENT OFFICE.

WILLIAM R. TEMPLETON, OF ROSLINDALE, MASSACHUSETTS.

TRAP.

Application filed December 2, 1921. Serial No. 519,350.

This invention relates to traps and particularly to a device adapted for automatically removing a liquid from a tank or chamber containing a gas under pressure thereby keeping the tank free from an accumulation of liquid.

The device is useful wherever a tank or chamber contains a gaseous material under pressure in which a liquid is apt to accumulate and which it is desired to keep free from liquid. Merely as illustrating one such use I would refer to the compressed air tanks which are used on cars having an air brake equipment and which furnish the compressed air for operating the brakes. In practice it is found that water will accumulate in such compressed air tanks, this being due to the moisture in the atmosphere which is condensed in the tank when the air is forced thereinto under pressure.

My improved trap is constructed so that when it is attached to a tank of this type, it will operate to remove the water automatically from the tank as fast as it accumulates therein so that the tank will always be free of water.

A device embodying my invention comprises a trap member having a float chamber, means for connecting the upper end of said chamber to the bottom of the tank, means for maintaining in the float chamber a pressure slightly less than that in the tank so that there will be a slow continuous passage of air from the tank to the float chamber which is sufficient to carry with it into the float chamber any liquid accumulating in the tank, and a normally-closed float-controlled discharge valve at the bottom of the float chamber and arranged so that when the liquid level in the float chamber reaches a pre-determined point the discharge valve is opened to allow the water therein to discharge.

In order to give an understanding of the invention I have illustrated in the drawings a selected embodiment thereof which will now be described after which the novel features will be pointed out in the appended claims.

Fig. 1 is a view showing the trap member and tank connected.

Fig. 2 is a vertical sectional view through the trap.

Fig. 3 is a sectional view showing the auxiliary discharge valve.

In the drawings 1 indicates a tank or reservoir which is designed to contain gas under pressure. This tank is shown as supported beneath a floor or support 2 by means of suitable hangers 3.

While, so far as the invention is concerned, the tank 1 might be any tank adapted to contain a gaseous material under pressure, yet merely for convenience I will refer to it as a tank containing compressed air which may be used for various purposes.

The trap device for removing water or liquid from the tank 1 as it accumulates therein comprises a trap member 4 having a float chamber 5, the upper end of which is connected to the bottom of the tank 1 by means of a suitable line of piping 6, so that air under pressure is maintained in said float chamber. The trap 4 may be placed either above the tank or below it. It is herein shown as being situated on the floor or support 2 underneath which the tank 1 is suspended. This float chamber 5 is provided with a vent port 7 which is controlled by a valve 8, preferably a needle valve, and when the device is in operation the valve 8 will be opened slightly so as to allow a slow escape of air from the float chamber 5. This will cause a continuous but slow flow of air from the tank 1 to the float chamber 5 through the pipe 6.

The trap member 4 is provided with a discharge port 28 near its lower end which leads to a discharge pipe 9. This port 28 is controlled by a discharge valve 10, preferably of the needle valve type, which is controlled by a float 11 operating in the float chamber 5, the arrangement being such that when the float is lowered, the valve 10 will be closed but when the float is raised said valve will be opened. In the construction herein shown the float is pivotally secured at 12 to the end of a lever 13 which is pivoted at 14 to a support 15, the valve 10 being pivoted to the lever 13 as shown at 16. The support 15 in turn is pivotally mounted at 17 so as to allow freedom of movement of the lever and to eliminate any binding of the valve.

In the operation of the device the weight of the float 11 will normally hold the valve 10 closed and the float chamber 5 will contain the same pressure as that in the tank 1 because of the free communication between the float chamber and tank afforded by the pipe 6, but owing to the fact that the vent valve 8 is slightly opened there will be a continuous flow of the compressed air or other gaseous material from the tank 1 to the float chamber 5 and through the vent port 7, this flow being sufficient to carry with it any liquid accumulating in the tank 1, and as fast as it accumulates. The liquid which is thus carried off from the tank 1 will be trapped in the float chamber 5 and when the liquid accumulates in the chamber sufficiently to lift the float 11 then the valve 10 will be opened and the pressure of the air in the float chamber will force the liquid out through the discharge port and thus deliver it to the discharge pipe. As the liquid level in the float chamber falls the float will descend thus closing the valve 10 again.

With this improvement, therefore, any water or other liquid accumulating in the tank 1 will be automatically removed therefrom as fast as it accumulates. When this device is used on the compressed air tanks of cars that are equipped with air brakes it will automatically keep such tanks free from an accumulation of water and will thus obviate the expense and labor incident to manually draining the water from the tanks every night as is the present common practice.

In the construction herein shown the discharge port 28 is formed in a valve seat member 18, which is screwed into the wall portion 19, and said valve seat member is formed with the guiding extension 20 beyond the valve seat, which extension operates to hold the valve 10 in position when it is unseated.

The float 11 is also shown as having a guiding pin 21 extending from its upper end, which pin operates in a recess formed in a plug 22 screwed into the top of the trap member 4.

The trap 4 is provided with a bevel plate 30 situated at its inlet and against which the air impinges as it is delivered through the pipe 6. The water in the air which passes into the float chamber 7 is caught on the bevel plate 30 and drips therefrom.

Where the tank 1 is used for storing compressed air which is forced into the tank by a compressor, it frequently happens that more or less oil will be carried over into the tank with the air from the compressor. Where this condition exists the oil will be carried into the float chamber 5 with the water, and because of its lighter specific gravity the oil will gather on the top of the water in the float chamber. This oil sometimes gathers in such quantities and congeals sufficiently so that it will interfere with the free movement of the float.

I have, therefore, provided means for automatically discharging the oil from the trap periodically thus obviating any danger that the float will become clogged by an accumulation of oil or grease.

I accomplish this by providing a second discharge port which is controlled by a valve so constructed that it will remain seated so long as the pressure in the float chamber is above a pre-determined point but will open automatically when the pressure falls below this pre-determined point. Simply for the purpose of illustration I will assume that this valve may be set to open when the pressure in the float chamber falls below two pounds. With this arrangement, so long as the tank contains air under pressure the valve will remain closed but when the tank is relieved of this pressure the valve will automatically open thus allowing all the water and oil in the float chamber to be discharged.

The second discharge valve herein illustrated is shown at 31 and it is normally seated against a valve seat 32 and is acted upon by a spring 33 which tends to open the valve, said spring being adjusted so that it will serve to open the valve when the pressure is reduced to a pre-determined point. The valve is connected to the float chamber 5 by means of a goose neck pipe 34, said pipe opening into the bottom of the float chamber. The valve leads to a discharge pipe 35 through which the water and oil is conveyed to any suitable place.

In the operation of this device it will be evident that so long as the pressure in the tank 1 is above the pre-determined low point, which for instance we will assume to be two pounds, the valve 31 will remain closed and the trap will function as above described. If, however, the pressure in the float chamber 5 falls below two pounds then the spring 33 will open the valve and the low pressure in the tank will blow the water and any oil therein out through the discharge valve and discharge pipe 35.

When a street railway car or a steam railway car equipped with this improvement has been taken to the yard after its day's run the air will gradually escape from the tank 1 and when the pressure in the tank falls below the two pound point, or other pre-determined point, then the valve 31 will automatically open so as to clean the trap of any water and oil therein. When the car is put in use again the next morning and the air pressure is supplied to the tank 1 the valve 31 will automatically close so that the trap will function as above described to remove the water automatically as it accumulates.

I have also provided means for adjusting the tension of the spring 33. This is accomplished by an adjusting member 36 which has screw-threaded engagement with the valve seat member 37 and which forms a backing or support for the spring 33.

By adjusting this member 36 up or down on the valve seat member the tension of the spring can be varied thus providing that the valve 31 will open when the pressure of the float chamber reaches any pre-determined point.

While I have herein illustrated a selected embodiment of the invention I do not wish to be limited to the constructional features shown.

I claim.

1. In a system for automatically removing liquid from a tank containing gaseous fluid under pressure, the combination with said tank, of a trap assembly situated above the tank and provided with a float chamber, a conduit connecting the bottom of the tank with the upper portion of the float chamber, said float chamber having a continuously open port which allows a slow but continuous flow of compressed gaseous fluid from the tank to the float chamber sufficient to carry with it any liquid which tends to accumulate in the tank, and a float-controlled discharge passage leading from the float chamber.

2. In a system for automatically removing liquid from a tank containing gaseous fluid under pressure, the combination with said tank, of a trap assembly provided with a float chamber having its upper end connected to the bottom of the tank, a float-controlled discharge port leading from said float chamber, means to carry into the float chamber any liquid as it tends to accumulate in the tank, said float chamber having a second discharge port for draining the chamber leading therefrom, a valve controlling said latter port which is normally held seated by the pressure in the float chamber, and means to open said valve automatically when the pressure in the float chamber falls below a pre-determined point.

3. In a trap of the class described, the combination with a tank containing gaseous material under pressure, of a trap member having a float chamber, the upper end of which is connected to the bottom of the tank, means to effect a transfer into the float chamber of any liquid as it accumulates in the tank, a float-controlled discharge valve to permit the escape from the float chamber of accumulated water, and other means controlled by the pressure in the float chamber to discharge all liquid therefrom when the pressure therein falls below a pre-determined point.

In testimony whereof, I have signed my name to this specification.

WILLIAM R. TEMPLETON.